(12) United States Patent  
Himmelmann

(10) Patent No.: US 8,604,651 B2  
(45) Date of Patent: Dec. 10, 2013

(54) COOLING OF PERMANENT MAGNET ELECTRIC MACHINE

(75) Inventor: Richard A. Himmelmann, Beloit, WI (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 352 days.

(21) Appl. No.: 13/030,720

(22) Filed: Feb. 18, 2011

(65) Prior Publication Data

US 2012/0212082 A1 Aug. 23, 2012

(51) Int. Cl.
H02K 9/08 (2006.01)

(52) U.S. Cl.
USPC .................................. 310/52; 310/54; 310/89

(58) Field of Classification Search
USPC ................ 310/52–59, 60 R, 61–63, 60 A, 64
See application file for complete search history.

(56) References Cited

U.S. PATENT DOCUMENTS

| 4,514,652 | A | | 4/1985 | Olson | |
|---|---|---|---|---|---|
| 4,647,805 | A | | 3/1987 | Flygare et al. | |
| 4,745,315 | A | * | 5/1988 | Terry et al. | 310/68 D |
| 4,839,547 | A | * | 6/1989 | Lordo et al. | 310/60 A |
| 4,862,024 | A | | 8/1989 | Stingle et al. | |
| 4,904,890 | A | * | 2/1990 | Archibald et al. | 310/59 |
| 4,994,700 | A | | 2/1991 | Bansal et al. | |
| 5,763,969 | A | * | 6/1998 | Metheny et al. | 310/62 |
| 6,437,468 | B2 | | 8/2002 | Stahl et al. | |
| 6,727,609 | B2 | | 4/2004 | Johnsen | |
| 7,327,055 | B2 | | 2/2008 | Devine | |
| 7,701,095 | B2 | | 4/2010 | Gizaw et al. | |
| 7,808,136 | B2 | | 10/2010 | Knauff | |
| 7,911,091 | B2 | | 3/2011 | Takenaka et al. | |

FOREIGN PATENT DOCUMENTS

JP 2007325436 A * 12/2007

* cited by examiner

Primary Examiner — Tran Nguyen
(74) Attorney, Agent, or Firm — Cantor Colburn LLP

(57) ABSTRACT

A cooling system for a sealed permanent magnet electric machine includes a fan element configured to urge an airflow across a plurality of permanent magnets of a rotor of the electric machine to remove thermal energy therefrom. A plurality of cooling channels are located in a housing of the electric machine and are configured to transfer thermal energy from a stator of the electric machine to a flow of liquid coolant through the plurality of cooling channels. A heat exchanger is located in thermal communication with the plurality of cooling channels to transfer thermal energy from the airflow to the liquid coolant. One or more coolant supply conduits are configured to divert a portion of the airflow from the heat exchanger to an ancillary component of the electric machine to allow for transfer of thermal energy from the ancillary component to the airflow.

16 Claims, 4 Drawing Sheets

COOLING OF PERMANENT MAGNET ELECTRIC MACHINE

BACKGROUND OF THE INVENTION

The subject matter disclosed herein relates to electric machines. More specifically, the subject disclosure relates to cooling of permanent magnet electric machines.

Permanent magnet electric machines such as motors and generators have been in use for many years. Permanent magnet machines have been favored over other types due to their efficiency, simplicity, robustness and tolerance to large radial air gaps between the rotor and the stator of the machine. Permanent magnet machines, however, require cooling of the permanent magnets to prevent demagnetization of the permanent magnets. This begins to occur generally for some magnet materials when the permanent magnets exceed a temperature of about 200 degrees Celsius, while others can begin to demagnetize at lower temperatures. Once demagnetization occurs, the electric machine is no longer capable of meeting specified performance targets.

Several methods to prevent demagnetization are typically used. First, the machine may be designed with enough excess capability to reduce the magnet thermal load. This, however, results in machines that are overly physically large. Other machines utilize a fan to introduce relatively cool air to the permanent magnet surfaces. This type of cooling cannot be used, however, when the machine needs to be sealed from the outside environment. A third method is to flood the rotor cavity of the machine with coolant. This is useful in machines that must be sealed from the outside environment, but windage losses on the rotor, due to the presence of the coolant can impact efficiency of the machine rather severely. A fourth method utilizes an active system where coolant is sprayed directly onto the magnets or is circulated through the rotor assembly. This approach typically requires a lubrication system and scavenge system, especially if the machine cannot gravity drain.

Further, in high power systems, ancillary components such as an inverter/active rectifier (hereinafter "inverter") and/or power leads connecting the inverter to the electric machine are subjected to the same harsh environments as the electric machine and have a need to be effectively cooled to preserve their functional life. Typically the inverter is equipped with dedicated heat sinks, internal electrically operated fans, heat pumps, etc. to keep the components within their thermal ratings. These cooling devices substantially increase the cost, size and complexity of the inverter and typically decrease reliability of the electric machine/inverter system.

BRIEF DESCRIPTION OF THE INVENTION

According to one aspect of the invention, a cooling system for a sealed permanent magnet electric machine includes a fan element configured to urge an airflow across a plurality of permanent magnets of a rotor of the electric machine to remove thermal energy therefrom. A plurality of cooling channels are located in a housing of the electric machine and are configured to transfer thermal energy from a stator of the electric machine to a flow of liquid coolant through the plurality of cooling channels. A heat exchanger is located in thermal communication with the plurality of cooling channels to transfer thermal energy from the airflow to the liquid coolant. One or more coolant supply conduits are configured to divert a portion of the airflow from the heat exchanger to an ancillary component of the electric machine to allow for transfer of thermal energy from the ancillary component to the airflow.

According to another aspect of the invention, a permanent magnet electric machine includes a rotor having a plurality of permanent magnets and a stator in magnetic communication with the rotor and positioned defining a radial air gap between the rotor and the stator. A housing is configured to seal the rotor and the stator from an outside environment. A fan element is configured to urge an airflow across the plurality of permanent magnets to remove thermal energy therefrom, and a plurality of cooling channels are located in the housing and are configured to transfer thermal energy from the stator to a flow of liquid coolant through the plurality of cooling channels. A heat exchanger is located in thermal communication with the plurality of cooling channels to transfer thermal energy from the airflow to the liquid coolant. One or more coolant supply conduits are configured to divert a portion of the airflow from the heat exchanger to an ancillary component of the electric machine to allow for transfer of thermal energy from the ancillary component to the airflow.

According to yet another aspect of the invention, a method of cooling a sealed permanent magnet electric machine includes moving a flow of liquid coolant through a plurality of cooling channels in a housing of the electric machine. Thermal energy is transferred from a stator of the electric machine to the liquid coolant flowing through the plurality of cooling channels. Air is circulated inside of the housing past a plurality of permanent magnets of a rotor of the electric machine and thermal energy is transferred from the plurality of permanent magnets to the air. The thermal energy of the air is then transferred from the air to the liquid coolant. At least a portion of the airflow from the electric machine is urged to an ancillary component of the electric machine, and the airflow is flowed through the ancillary component to transfer thermal energy from the ancillary component to the airflow.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
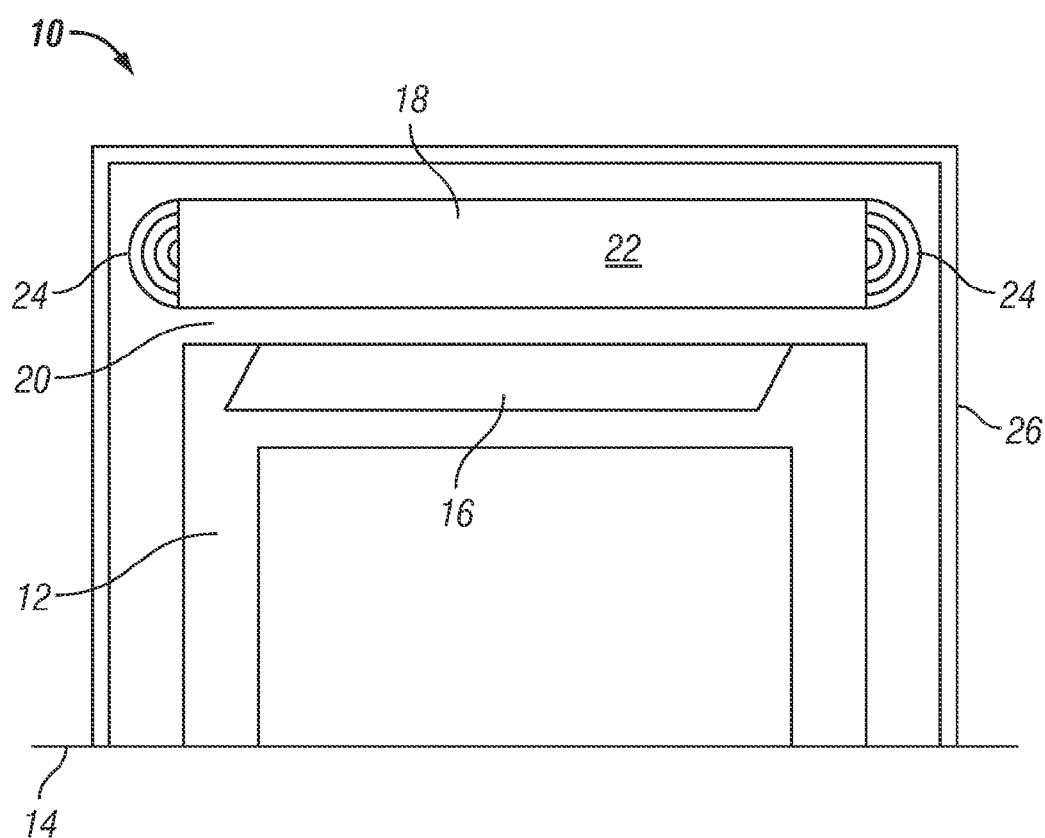
FIG. 1 is a cross-sectional view of an embodiment of a permanent magnet electric machine.

Shown in FIG. 1 is a cross-sectional view of a permanent magnet electric machine 10. The electric machine 10 includes a rotor assembly 12 rotatably located at an electric machine axis 14. The rotor 12 includes a plurality of permanent magnets 16. A stator 18 is located radially outboard of the rotor 12 defining a radial air gap 20 between the stator 18 and the rotor 12. The stator 18 includes a stator core 22 and a plurality of stator windings 24 extending through the stator core 22 which are magnetically interactive with the permanent magnets 16. The rotor 12 and stator 18 are located inside of a housing 26 which seals the electric machine 10 from the outside environment.

Figure 2:
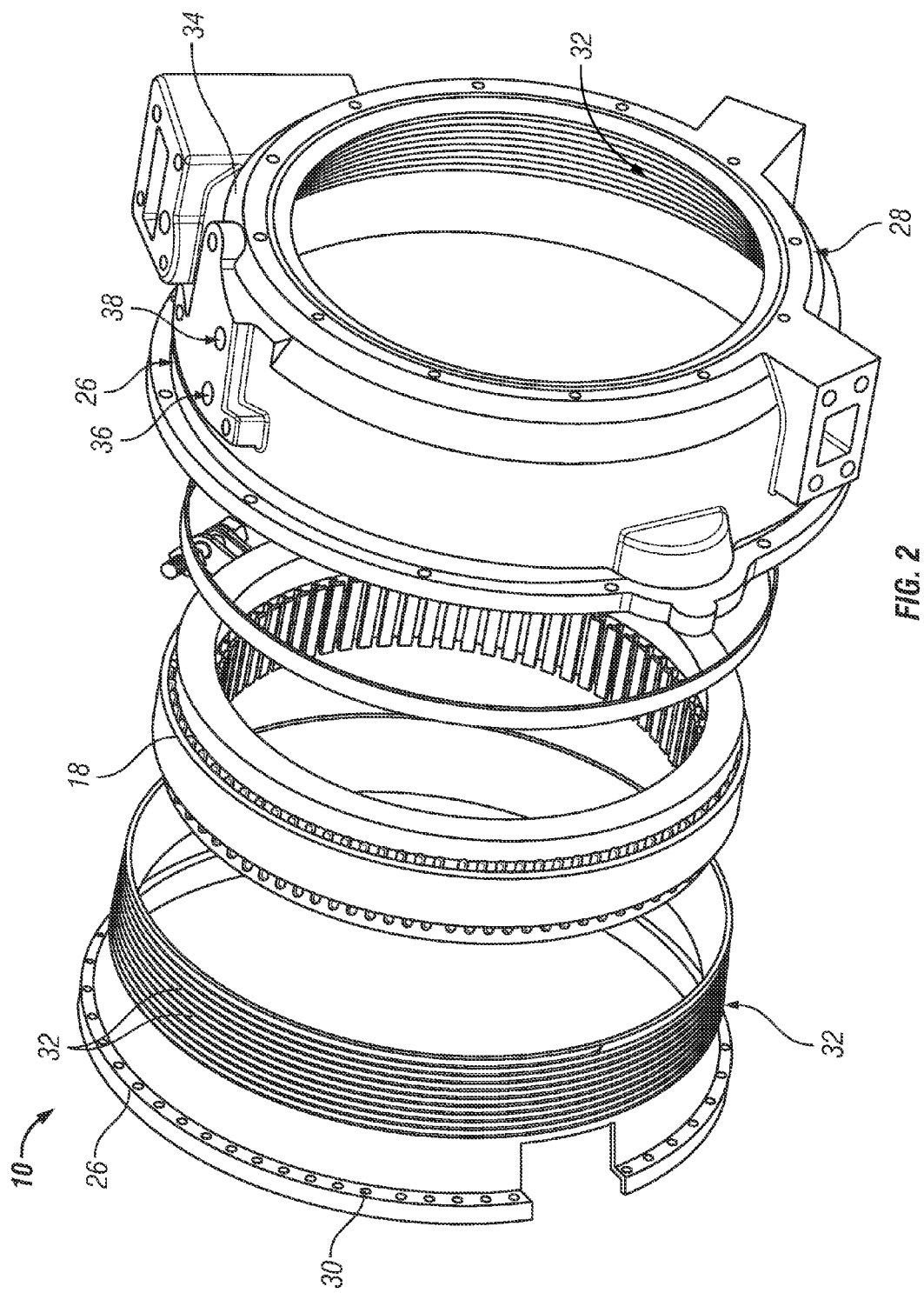
FIG. 2 is an exploded view of an embodiment of a permanent magnet electric machine.
Figure 3:
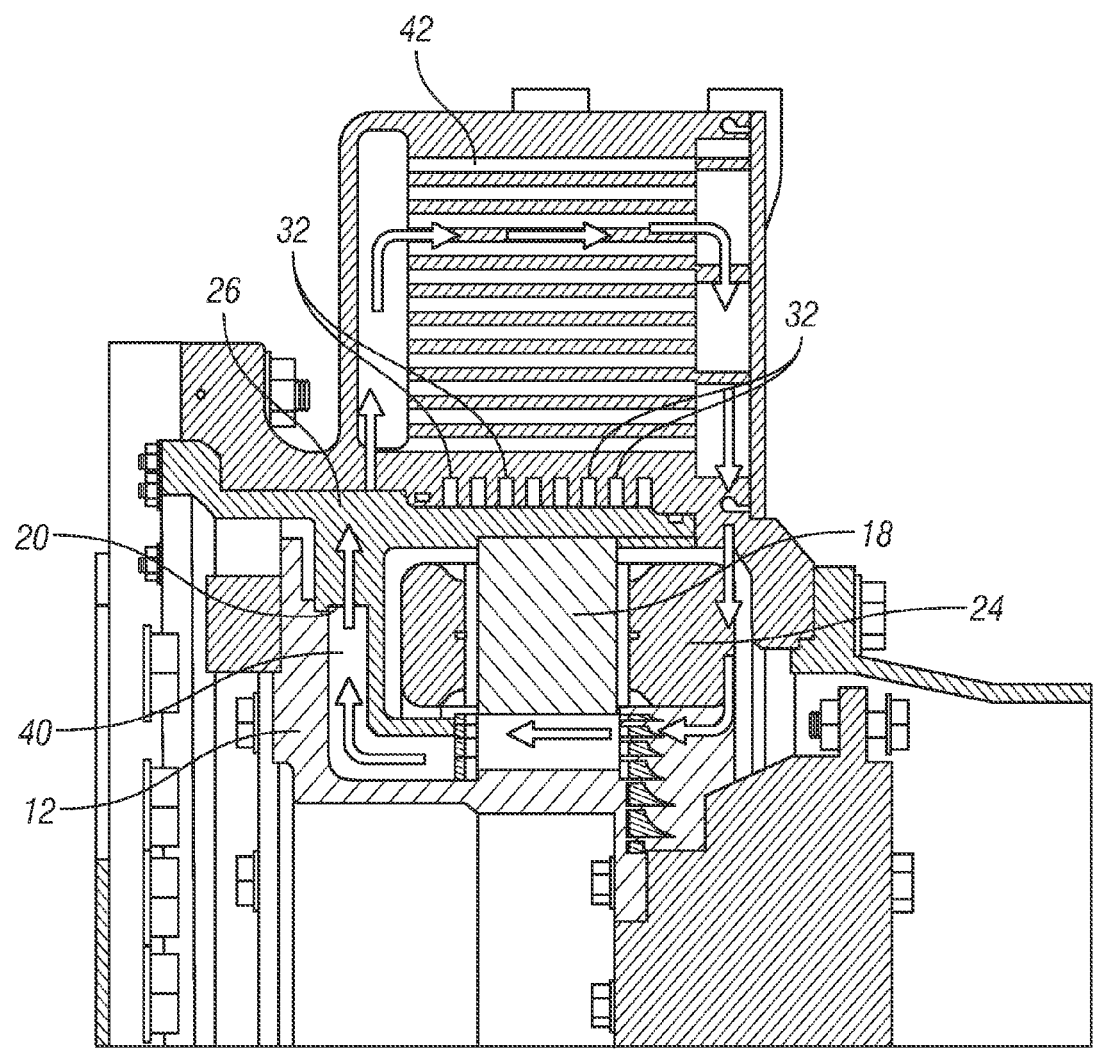
FIG. 3 is another cross-sectional view of an embodiment of a permanent magnet electric machine.

Shown in FIG. 2 is an exploded view of the electric machine 10. The housing 26 includes an outer housing 28 and an inner housing 30 located between the outer housing 28 and the stator 18. A plurality of cooling channels 32 are located in the housing 26 between the stator 18 and an outer diameter 34 of the housing 26. As shown in FIG. 2, in some embodiments, the plurality of cooling channels 32 extend circumferentially around the electric machine 10. It is to be appreciated, however, that other arrangements of cooling channels 32, for example labyrinthine, axially-extending, or spiral helix cooling channels 32 or pin fins or the like are contemplated within the scope of the present disclosure. One or more coolant inlets 36 and one or more coolant outlets 38 are located in the housing 26 and are connected to the plurality of cooling channels 32 for input of coolant to and output of coolant from the plurality of cooling channels 32. The coolant is, for example, water, or a mixture of water and ethylene glycol, or a mixture of water and propylene glycol, oil, or any other suitable fluid. Coolant is input into the plurality of cooling channels 32 via the one or more coolant inlets 36 from a coolant source (not shown). As the coolant flows through the plurality of cooling channels 32, as shown in FIG. 3, thermal energy is transferred to the coolant from the stator 18. The coolant flows through the plurality of cooling channels 32 without entering the rotor 12, or the rotor cavity. The coolant exits the housing 26 via the one or more coolant outlets 38 and the thermal energy is dissipated external to the electric machine 10.

Referring still to FIG. 3, the electric machine 10 further includes an air cooling circuit. A pumping element, for example, a centrifugal blower 40 is located at the rotor 12. Even though the electric machine 10 is sealed from the outside environment, a volume of air is present inside the housing 26. When driven by the rotor 12, the centrifugal blower 40 adds head to the volume of air in the housing 26, forcing the air over the permanent magnets 16 and across the air gap 20 to establish a closed loop airflow. In some embodiments, as shown in FIG. 3, the stator windings 24 are elongated at least one side of the stator core 22, such that the volume of air forced over the permanent magnets 16 is also directed across and/or through the stator winding 24 to remove thermal energy therefrom. It is to be appreciated that while the embodiment of FIG. 3 includes a centrifugal blower 40, other embodiments may include other fan elements to add head to the volume of air. For example, some embodiments may include fan features integral to, or attached to, the rotor 12. The air flow across the permanent magnets 16 transfers thermal energy from the permanent magnets 16 to the air. The air flows across the air gap 20 and into a heat exchanger 42 integral with the housing 26 radially outboard of the plurality of cooling channels 32. While the embodiment of FIG. 3 includes a heat exchanger 42 integral with the housing 26, it is to be appreciated that other embodiments may include other heat exchanger 42 configurations and/or locations. For example, the heat exchanger 42 may be secured to an exterior of the housing 26, or in another location, with cooling channels 26 extending to the heat exchanger 42. At the heat exchanger 42, the thermal energy in the air is transferred into the heat exchanger 42 and then subsequently into the coolant flowing through the cooling channels 32. The coolant removes the thermal energy from the electric machine as described previously. The centrifugal blower 40 maintains the flow of air through the machine such that when the heat is removed in the heat exchanger 42, the air circulates back to the rotor 12 across the air gap 20 and across the permanent magnets 16 to absorb more heat therefrom.

Figure 4:
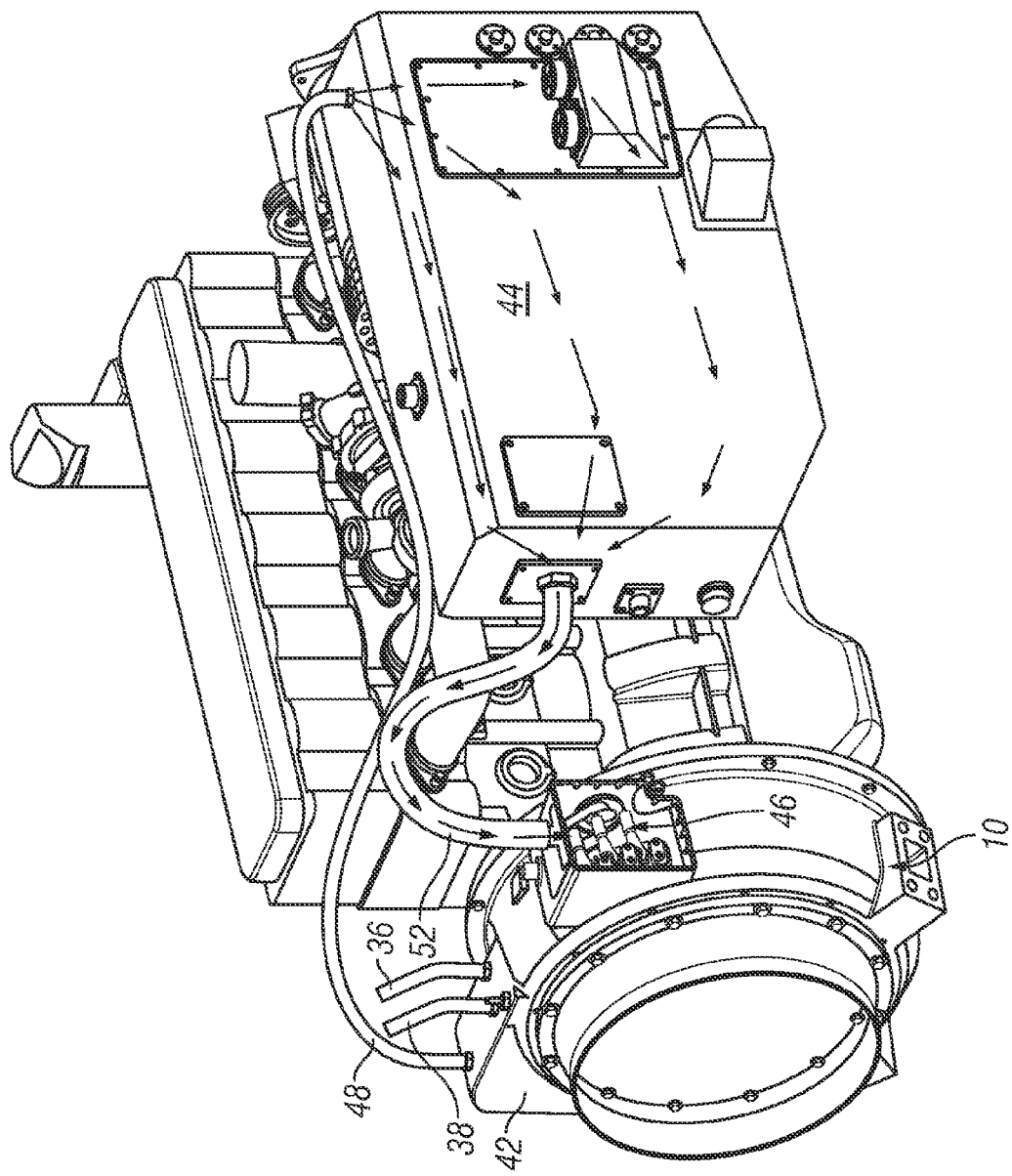
FIG. 4 is a schematic view of another embodiment of an electric machine.

Referring now to FIG. 4, one or more ancillary components 44, such as an inverter and/or active rectifier or an electric machine controller are connected to the electric machine 10 via one or more power leads 46, which transfer power between the electric machine 10 and the ancillary component 44. A portion of the airflow is diverted from the heat exchanger 42 to the ancillary component 44 through one or more cooling air supply conduits 48 which extend from the heat exchanger 42 to the ancillary component 44. The cooling air flows from the supply conduits 48 into an interior of the ancillary component 44 through, for example, a plurality of component cooling passages (not shown), removing thermal energy from the ancillary component 44 by transferring it into the airflow. The airflow is then returned to the electric machine 10 where the thermal energy is removed from the airflow, which is recycled into the closed loop air cooling system of the electric machine 10 as described above.

In some embodiments, the airflow proceeds out from the interior of the ancillary component 44 via a power lead housing 52 which contains the one or more power leads 46. In some embodiments, such as where the electric machine 10 operates under water or other hostile environment, the power lead housing 52 is air tight. As the airflow flows through the power lead housing 52, additional thermal energy is transferred to the airflow from the power leads 46, thus cooling the power leads 46. Cooling of the power leads 52 allows the power leads 52 to be formed from a smaller gauge wire than similar uncooled power leads. The airflow then continues to the electric machine 10 where the thermal energy is removed from the airflow, which is recycled into the closed loop air cooling system of the electric machine 10 as described above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cooling system for an ancillary component of an electric machine comprising:
   a pumping element configured to urge an airflow across a plurality of permanent magnets of a rotor of the electric machine to remove thermal energy therefrom;
   a plurality of cooling channels disposed in a housing of the electric machine configured to transfer thermal energy from a stator of the electric machine to a flow of fluid coolant through the plurality of cooling channels;
   a heat exchanger in thermal communication with the plurality of cooling channels to transfer thermal energy from the airflow to the fluid coolant;
   one or more coolant supply conduits extending from the electric machine to the ancillary component to divert a portion of the airflow from the heat exchanger to an ancillary component of the electric machine to allow for transfer of thermal energy from the ancillary component to the airflow; and one or more power leads extending through the one or more coolant supply conduits to operably connect the ancillary component to the electric machine.

2. The cooling system of claim 1, wherein the ancillary component is an inverter and/or an active rectifier.

3. The cooling system of claim 1, wherein the airflow through the one or more coolant supply conduits cools the one or more power leads.

4. The cooling system of claim 3, wherein the airflow is returned to the electric machine via the one or more coolant supply conduits.

5. The cooling system of claim 3, wherein the power lead housing is substantially airtight.

6. The cooling system of claim 1, wherein the pumping element is a centrifugal blower.

7. The cooling system of claim 1, wherein the heat exchanger is integral to the housing.

8. A permanent magnet electric machine comprising:
   a rotor including a plurality of permanent magnets;
   a stator in magnetic communication with the rotor and positioned defining a radial air gap between the rotor and the stator;
   a housing configured to seal the rotor and the stator from an outside environment;
   a pumping element configured to urge an airflow across the plurality of permanent magnets to remove thermal energy therefrom;
   a plurality of cooling channels disposed in the housing configured to transfer thermal energy from the stator to a flow of fluid coolant through the plurality of cooling channels;
   a heat exchanger in thermal communication with the plurality of cooling channels to transfer thermal energy from the airflow to the fluid coolant;
   one or more coolant supply conduits extending from the electric machine to an ancillary component of the electric machine to divert a portion of the airflow from the heat exchanger to the ancillary component of the electric machine to allow for transfer of thermal energy from the ancillary component to the airflow; and
   one or more power leads extending through the one or more coolant supply conduits to operably connect the ancillary component to the electric machine.

9. The electric machine of claim 8, wherein the ancillary component is an inverter and/or an active rectifier.

10. The electric machine of claim 8, wherein the airflow through the one or more coolant supply conduits cools the one or more power leads.

11. The electric machine of claim 10, wherein the airflow is returned to the electric machine via the one or more coolant supply conduits.

12. The electric machine of claim 8, wherein the pumping element is a centrifugal blower.

13. The electric machine of claim 8, wherein the heat exchanger is integral to the housing.

14. A method of cooling an ancillary component of a sealed permanent magnet electric machine comprising:
    moving a flow of fluid coolant through a plurality of cooling channels in a housing of the electric machine;
    transferring thermal energy from a stator of the electric machine to the fluid coolant flowing through the plurality of cooling channels;
    urging a circulation of air inside of the housing past a plurality of permanent magnets of a rotor of the electric machine;
    transferring thermal energy from the plurality of permanent magnets to the air;
    transferring thermal energy from the air to the fluid coolant;
    urging at least a portion of the airflow from the electric machine to an ancillary component of the electric machine via one or more coolant supply conduits extending from the electric machine to the ancillary component;
    flowing the airflow through the ancillary component;
    transferring thermal energy from the ancillary component to the airflow; and
    cooling one or more power leads disposed in the one or more coolant supply conduits via the airflow through the one or more coolant supply conduits.

15. The method of claim 14, comprising urging the portion of the airflow from the electric machine to the ancillary component from a heat exchanger disposed in the housing.

16. The method of claim 14, comprising transferring thermal energy from windings of the stator by flowing the airflow through the windings.

\* \* \* \* \*